United States Patent
Singh et al.

(10) Patent No.: US 10,097,697 B1
(45) Date of Patent: Oct. 9, 2018

(54) ESTABLISHING AND MAINTAINING A VOIP CALL

(71) Applicant: WhatsApp Inc., Mountain View, CA (US)

(72) Inventors: Manpreet Singh, Santa Clara, CA (US); Ehren A. Kret, Cupertino, CA (US); Erik James Reed, Dublin, CA (US); Michael B. Donohue, Mountain View, CA (US)

(73) Assignee: WHATSAPP INC., Menlo Park, CA (US)

( * ) Notice: Subject to any disclaimer, the term of this patent is extended or adjusted under 35 U.S.C. 154(b) by 238 days.

(21) Appl. No.: 14/480,227

(22) Filed: Sep. 8, 2014

(51) Int. Cl.
| | |
|---|---|
| *H04L 12/26* | (2006.01) |
| *H04W 4/18* | (2009.01) |
| *H04M 15/00* | (2006.01) |
| *H04L 25/20* | (2006.01) |
| *H04L 29/08* | (2006.01) |
| *H04W 76/10* | (2018.01) |

(52) U.S. Cl.
CPC ............ *H04M 15/56* (2013.01); *H04L 25/20* (2013.01); *H04L 67/26* (2013.01); *H04W 76/10* (2018.02)

(58) Field of Classification Search
CPC .............................. H04W 36/30; H04W 88/04
USPC ........ 455/437, 436; 370/241, 252, 401, 216, 370/229, 315; 709/203, 207
See application file for complete search history.

(56) References Cited

U.S. PATENT DOCUMENTS

| | | | |
|---|---|---|---|
| 9,148,519 B1 * | 9/2015 | Judge ................. | H04M 7/006 |
| 2002/0196923 A1 | 12/2002 | Donnelly | |
| 2004/0177122 A1 * | 9/2004 | Appelman ........... | G06Q 10/107 |
| | | | 709/206 |
| 2005/0020265 A1 * | 1/2005 | Funabiki ................. | H04L 45/04 |
| | | | 455/436 |
| 2008/0040441 A1 * | 2/2008 | Maes ..................... | H04L 51/04 |
| | | | 709/207 |
| 2008/0159313 A1 * | 7/2008 | Rasanen ........... | H04L 29/12216 |
| | | | 370/401 |
| 2010/0002684 A1 | 1/2010 | Chun | |

(Continued)

OTHER PUBLICATIONS

International Search Report and Written Opinion received for PCT Patent Application No. PCT/US2015/046862, dated Dec. 4, 2015, 14 pages.

(Continued)

*Primary Examiner* — Alpus H Hsu
*Assistant Examiner* — Camquyen Thai

(57) ABSTRACT

A system, apparatus, and methods are provided for establishing and supporting a VOIP (Voice Over Internet Protocol) call from one computing/communication device to another. The system receives a call offer from a caller, forwards it to the callee, and identifies to each party multiple candidate relay entities for relaying their digitized voice communications. Each device binds with one or all relays, and either or both of them select one of the relays to use in a relay mode of operation of the call, if necessary. One or more of the relays inform the devices of their external network addresses, and each device passes its (internal and external) addresses to each other, through the system. The devices attempt to establish a direct connection to conduct their call in a peer-to-peer mode of operation, but may dynamically switch between peer-to-peer and relay modes as necessary.

20 Claims, 4 Drawing Sheets

(56) References Cited

U.S. PATENT DOCUMENTS

| | | | |
|---|---|---|---|
| 2010/0088427 A1* | 4/2010 | Mo | H04L 45/00 709/241 |
| 2010/0097924 A1* | 4/2010 | Yamaguchi | H04L 1/0009 370/216 |
| 2011/0145426 A1* | 6/2011 | Miyajima | H04L 63/0272 709/230 |
| 2012/0147766 A1 | 6/2012 | Brown et al. | |
| 2012/0287843 A1* | 11/2012 | Watanabe | H04B 7/155 370/315 |
| 2013/0138822 A1* | 5/2013 | Hu | H04L 65/1069 709/227 |
| 2013/0242981 A1 | 9/2013 | Croak et al. | |
| 2013/0247117 A1* | 9/2013 | Yamada | G08C 17/02 725/93 |
| 2013/0258939 A1* | 10/2013 | Wang | H04W 40/12 370/315 |
| 2013/0308628 A1* | 11/2013 | Marueli | H04L 65/1076 370/352 |
| 2014/0071839 A1* | 3/2014 | Andersen | H04L 43/0852 370/252 |
| 2014/0135019 A1* | 5/2014 | Jang | H04W 76/043 455/437 |
| 2014/0153409 A1 | 6/2014 | Bucko et al. | |
| 2014/0201262 A1* | 7/2014 | Woo | H04L 67/42 709/203 |
| 2014/0241215 A1 | 8/2014 | Massover et al. | |
| 2014/0269674 A1 | 9/2014 | Meghani et al. | |
| 2015/0067819 A1* | 3/2015 | Shribman | H04L 67/06 726/12 |
| 2015/0188882 A1* | 7/2015 | Wang | H04L 61/2589 370/352 |
| 2016/0065446 A1* | 3/2016 | Li | H04L 45/121 370/315 |

OTHER PUBLICATIONS

Extended European Search Report received for European Patent Application No. 15183100.5, dated Jan. 14, 2016, 8 pages.

\* cited by examiner

ESTABLISHING AND MAINTAINING A VOIP CALL

BACKGROUND

This invention relates to the fields of computers and electronic communications. More particularly, a system, apparatus, and methods are provided for establishing and maintaining a VOIP (Voice Over Internet Protocol) call.

Existing VOIP schemes have limited flexibility, meaning that if an address (e.g., an IP address) of a device engaged in a VOIP call changes, the VOIP connection generally fails and one or both participants must re-initialize the call. In addition, establishing a VOIP call under an existing procedure typically requires extensive protocol negotiation, which can detract from a user's experience.

SUMMARY

In some embodiments of the invention, a system for facilitating establishment and maintenance of a VOIP call receives a call or call offer from a caller device, forwards it to the callee's device, and identifies to both devices multiple candidate relay entities available for relaying their digitized voice communications. Each device binds with one or all relays so that they allocate transport endpoints, and one or both of them select one of the relays to use if and when it becomes necessary.

One or more of the relays inform the devices of the devices' external network addresses, and each device passes its (internal and external) addresses to each other, through the system. The devices attempt to establish a peer-to-peer connection to conduct their call, but may dynamically switch between a peer-to-peer mode and a relay mode of operation as necessary or as desired.

In some embodiments, as one or both devices roam to different networks, they re-establish communication with the selected relay (and/or one or more other relays) to obtain their new (external) addresses, which are again shared with the other device, and they continue to attempt to establish a peer-to-peer connection. When unable to do so, the devices use the selected relay to relay their digitized communications.

A device's addresses may be prioritized or ordered to indicate which address is preferred or is more likely to be successful. For example, when one of the devices roams to a network other than a network used by the other device, it may prioritize its external address, a Wi-Fi address may be prioritized over a cellular address (i.e., an address within voice service provider's data network), etc.

DETAILED DESCRIPTION

The following description is presented to enable any person skilled in the art to make and use embodiments described herein. Various modifications to the disclosed embodiments will be readily apparent to those skilled in the art, and the general principles defined herein may be applied to other embodiments and applications without departing from the scope of the present disclosure.

In some embodiments, a system, apparatus, and methods are provided for establishing and maintaining a VOIP (Voice Over Internet Protocol) communication session (e.g., a VOIP call) between two devices. The VOIP connection is dynamic, meaning that it can switch back and forth between different modes as necessary or as desired—such as a relay mode in which the devices' digitized audio communications are relayed through another entity (e.g., a relay server) and a peer-to-peer (P2P) mode in which the devices communicate directly (i.e., without a relay entity).

For example, the devices may be able to establish a peer-to-peer connection, by being connected to the same Wi-Fi® access point for example. However, when one or both devices are moved and connect to different networks (e.g., a different Wi-Fi network or access point, a mobile carrier's network) and adopt different addresses, they may (temporarily) communicate through a relay entity, at least until they can re-establish a peer-to-peer connection (if they ever can). The devices may maintain connections with the system throughout the call, for signaling purposes (e.g., to negotiate or re-negotiate a P2P connection, to identify a relay entity), to exchange text or other non-audio content, and/or for other purposes.

Although the embodiments presented herein are described as implemented to support VOIP calls, the system, methods, and apparatus may be applied to other forms of digitized video and audio (e.g., voice) communications that do not strictly qualify as VOIP calls, because they do not employ the Internet Protocol for example.

In some embodiments, a method described herein may be incorporated into a communication application installed on mobile and/or stationary computing and/or communication devices (e.g., smart phones, tablet computers). In some particular embodiments, the application is a communication application in which text, images, video, voice recordings, and/or other electronic information are exchanged via data communication channels conforming to an IEEE 802.11 standard (e.g., Wi-Fi® connections), in addition to VOIP calls. For example, the application may be the WhatsApp® Messenger application provided by WhatsApp Inc.

Figure 1:
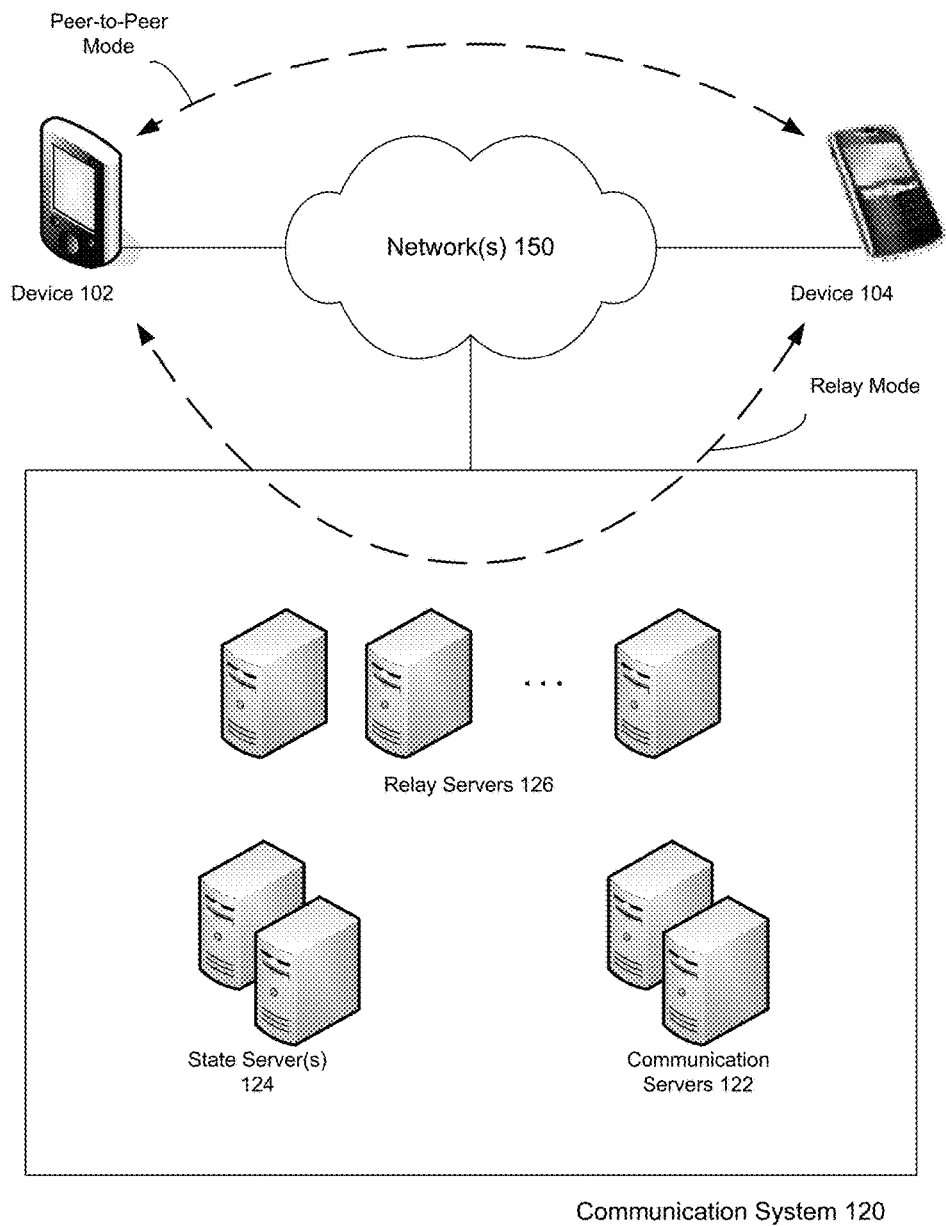
FIG. 1 is a block diagram of a system for establishing and maintaining a VOIP call, in accordance with some embodiments.

FIG. 1 is a block diagram of a system for establishing and maintaining a VOIP call, according to some embodiments.

In these embodiments, users of communication system 120 operate a variety of portable communication devices operating the same or different operating systems (e.g., Android, BlackBerry, iOS, Nokia S40, Symbian, Windows Phone). Thus, devices 102, 104 are operated by different users, and may be configured similarly or differently in terms of functionality, applications, utilities, etc. Each of them, however, executes a version of a common communication application hosted by communication system 120.

When used to engage in VOIP or some other form of digitized audio communications as described herein, one of devices 102, 104 is operated by a caller (or calling party) and may therefore be termed a caller device, while the other is operated by a callee (or called party) and may therefore be termed a callee device.

Illustrative digitized audio communications between devices 102, 104 may be direct (in the peer-to-peer mode) or indirect (in the relay mode). In the latter case, a relay server within or affiliated with communication system 120 receives packets or other communication elements from each device and relays them to or toward the other.

System 120 is a data center, computer network, or other cooperative collection of computing resources for hosting a communication application or service that can be used simultaneously by multiple users, or at least the server portion of such an application or service. As described above, in some implementations the application provides a user with VOIP capability as well as instant messaging of text, audio recordings, photos, video, and multimedia from his or her communication device (e.g., device 102), to/from communication devices operated by one or more other users (e.g., device 104).

The communication application hosted by system 120 is compatible with devices 102, 104 and includes client logic executed under the devices' native operating systems. A user operating one type of device and subscribing to one communication server provider can engage in VOIP calls and exchange messages with users operating other types of devices and subscribing to other communication service providers. Thus, a VOIP caller or calling party may use one device platform while a callee or called party uses a different platform.

In some embodiments, a callee or called party may participate in a call using a traditional land-line telephone coupled to POTS (Plain Old Telephone Service). In these embodiments, a component of system 120 acts as the endpoint for the traditional telephone connection, and provides digital-to-analog and analog-to-digital conversion.

Communication servers 122 are front-end components of system 120 that host users' connections with the system and that facilitate the exchange of communications between users. Servers 122 may be referred to as "chat" servers because they can receive real-time text messages and chat session communications from individual users for delivery to one or more other users. Although some messages handled by communication servers 122 may be termed "chat" messages, they are not limited to textual content and may instead (or also) contain embedded, attached, or associated (e.g., linked) media content, as well as protocol-level messages.

Communication servers 122 also help in the establishment and maintenance of VOIP calls between devices connected to system 120. As described below, for example, they may relay or help establish relevant call parameters (e.g., which codec or encoding scheme to use, which sampling rate to apply), provide a path by which the devices engaged or engaging in a call may pass non-audio data (e.g., their network addresses, current statuses, acceptance or rejection of the call), help switch from one mode to another if necessary, etc.

Communication servers 122 may also act as portals to other components of system 120. Thus, when a user requests a status of another user or updates a profile or other information, for example, his or her action may be routed to the appropriate system component by the communication server with which he or she is connected.

Illustratively, as long as a user is on-line with system 120 and the application is executing on his or her device, a connection or session may be maintained between the device and a communication server 122, including during a VOIP call. When the user closes the application on the device, or terminates a call, his or her connection may persist for some period of time (e.g., five minutes, fifteen minutes).

State servers 124 maintain states or statuses of users and/or users' devices. Thus, a state server stores some or all of a user's profile, including applicable preferences (e.g., preferred audible and/or visual alert, status message displayed to other users), device type/model, profile photo, etc. Some status information maintained by a state server with regard to a user may persist only for the duration of the user's current connection with system 120; other information may persist indefinitely. State server(s) 124 may also determine, or help determine, the eligibility of a target or potential recipient of a digitized audio call (e.g., a VOIP call).

Also, state servers 124 store information necessary for pushing messages to a user's device where necessary, such as a device token needed to communicate with the device via the user's service provider. This device token may also or alternatively be known as a "device URI (Uniform Resource Identifier)," a "registration id," a "PIN" (Personal Identification Number) or may have some other moniker. This token may be unique to a particular device or a particular user. In some situations, such as when a callee device is not already connected to system 120 (e.g., via a communication server 122), a push message may be dispatched to the device to wake it up and cause it to connect to the system, after which the call attempt or offer can be delivered, and this token may be required by the corresponding service provider in order to deliver the message.

Relay servers 126 are used during the relay mode of operation of a VOIP call to relay digitized audio between caller and callee devices. In some embodiments, the relay mode of operation is only conducted when a peer-to-peer mode is unavailable. During the relay mode, the communicating devices may periodically or regularly attempt to activate the peer-to-peer mode, especially whenever one of the devices changes networks—such as from one Wi-Fi network to another, from a Wi-Fi network to a mobile carrier's network (or vice versa), etc.

Any number (e.g., one or more) of communication servers, state servers, relay servers, and/or other servers may be deployed within system 120. The functions of servers 122, 124, 126 may be distributed differently in other embodiments, such as by being merged into fewer components or divided among additional components.

The servers of system 120 may be separate physical computer systems comprising distinct hardware resources (e.g., processor, storage, communication interface) and software resources (e.g., program code, data) suitable for performing the functions ascribed to them. In some alternative embodiments, any or all of the servers may be virtual computing machines that share hardware and/or software resources. Thus, multiple software server modules performing different functions (or the same function) may reside on one server computer within system 120.

Network(s) 150 provide communication paths between system 120 and users' devices and between different user devices, and may include data and/or voice communication channels. For carrying data communications, networks 150 may comprise the Internet, one or more intranets, LANs (Local Area Networks), WANs (Wide Area Networks), and/or other point-to-point or distributed connections, which may be wired and/or wireless in nature. For carrying voice communications, network(s) 150 may comprise wired and/or wireless voice communication links managed by different telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO), and so on.

Networks 150 may thus comprise various entities not shown in FIG. 1, such as routers, gateways, switches, base stations (e.g., wireless access points, Node Bs, Evolved Node Bs), and/or other equipment for establishing, maintaining, switching, or otherwise manipulating a data and/or digitized voice connection.

Figure 2A:
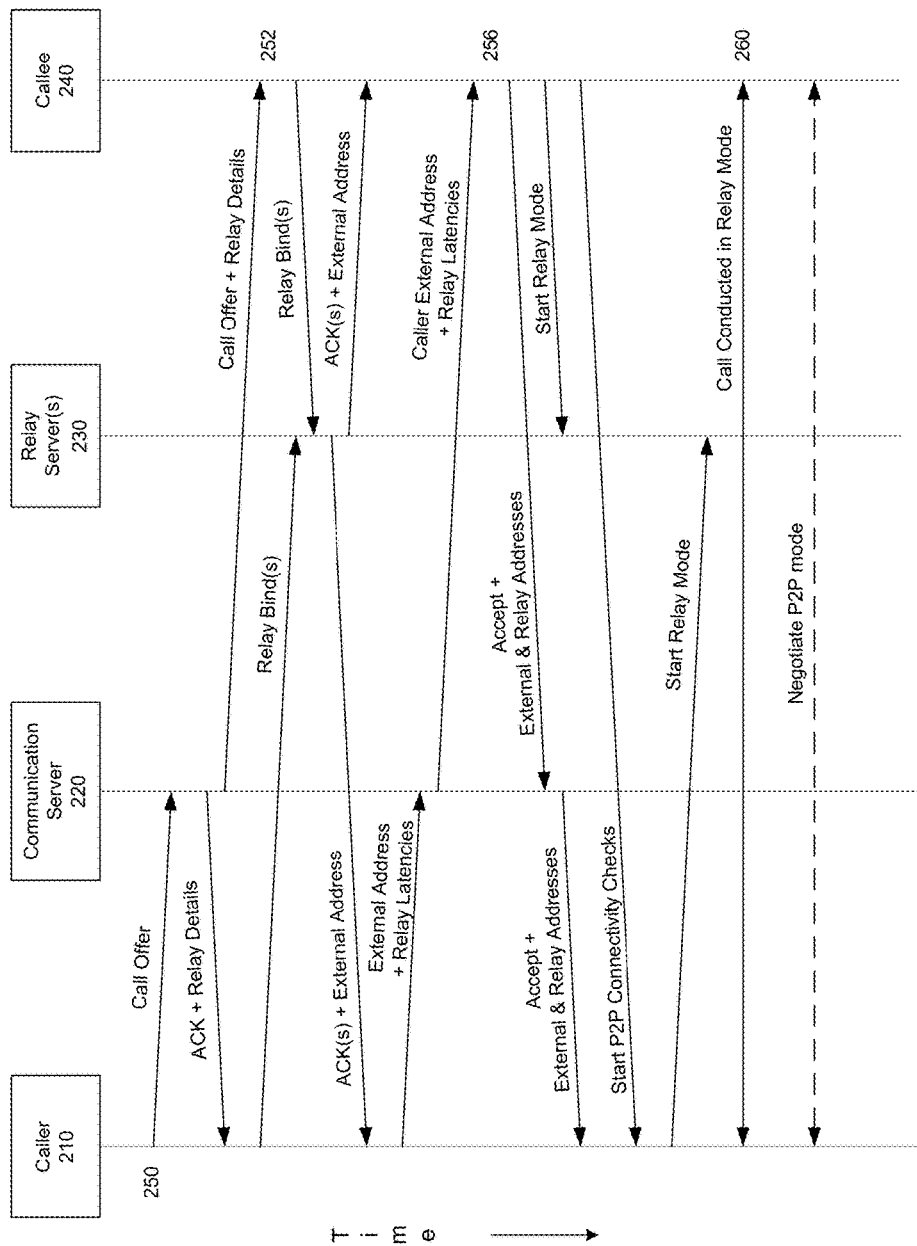
FIGS. 2A-B are time sequence diagrams illustrating a method of establishing and maintaining a VOIP call, in accordance with some embodiments.
Figure 2B:
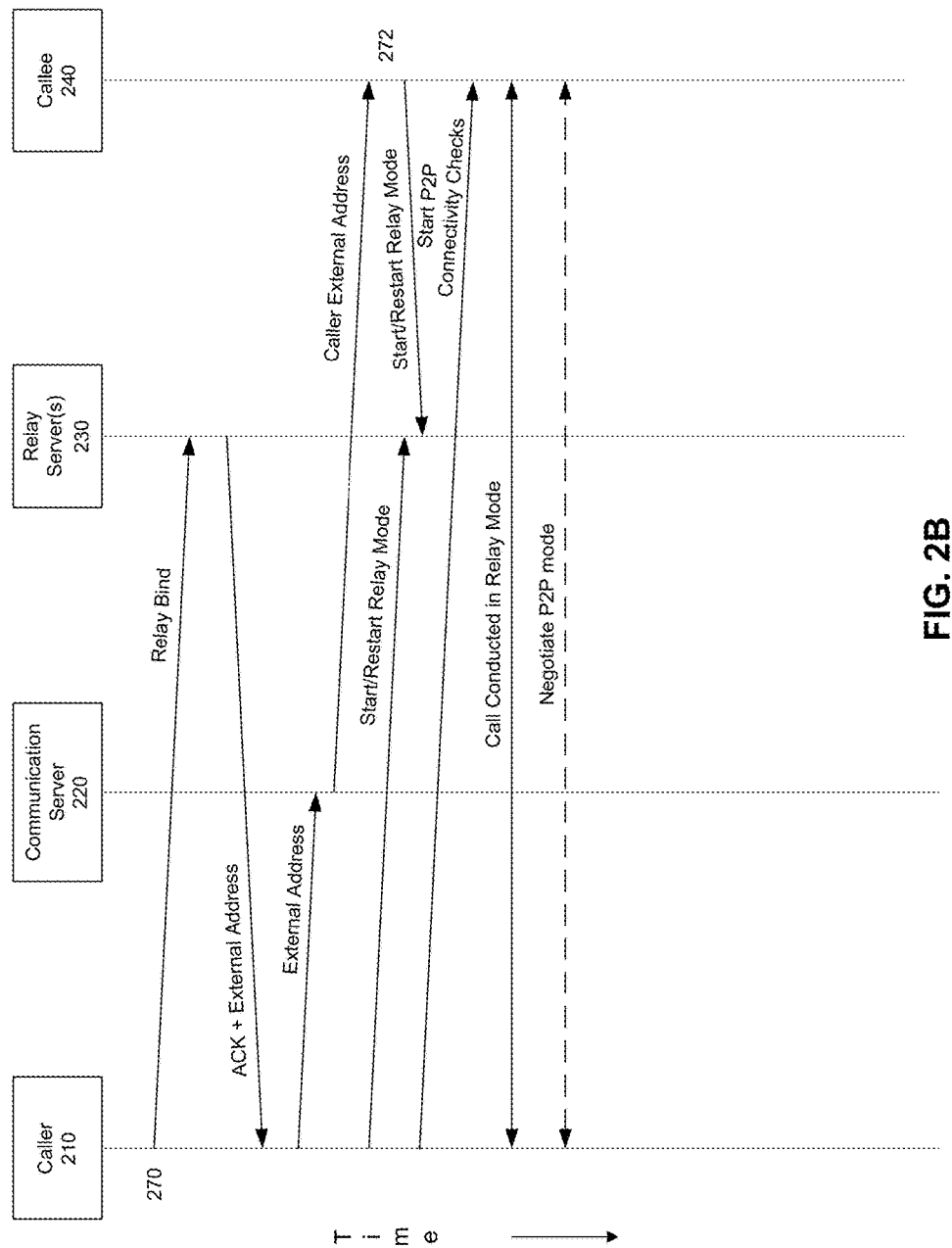

FIGS. 2A-B form a time-sequence diagram illustrating a method of establishing and maintaining a VOIP call, according to some embodiments.

In these embodiments, a caller uses a first client device (e.g., a smart phone, a computing device) to operate a communication application that features support for VOIP and/or other real-time digitized audio communications with one or more other parties. Caller 210 represents the caller and/or the caller's device. A callee uses a second client device to operate the same application or a compatible application, and callee 240 represents the callee and/or the callee's device.

In some implementations, a call may be established between more than just two parties. For example, a call offer from the caller may identify multiple distinct callees (or callee devices) or may include a group identifier that identifies a group of callees or a group of devices.

The communication application is hosted, operated, or otherwise managed by an application host system (e.g., system 120 of FIG. 1) that includes one or more communication servers (e.g., chat servers), relay servers, and/or other components. In some implementations, communication server 220 may be some other component of the application host system. Also, while the illustrated method is described as using one communication server to communicate with both the caller and callee, in other methods two or more cooperative communication servers may be employed, each hosting a connection with one of the parties.

Relay server 230 is another component of the application host system, or is provided by another entity that acts cooperatively with the application host system as described herein.

Prior to initiation of the VOIP call from caller 210 to callee 240, at least the caller device is connected to the application host system (e.g., communication server 220). For example, the caller may be exchanging textual (e.g., chat) messages with one or more other users, which may or may not include callee 240. Thus, before the caller can initiate the call, he must connect to the system. He may manually login to verify his identity, or his device may automatically log him in. Illustratively, a user's device may automatically open a connection to the application host system when the user starts the application or initiates a call.

Similarly, before the call can be connected to callee 240 (assuming the callee accepts the call), she or her device will need to login. Thus, although both parties must be registered users of the application and be connected to the system in order to engage in a VOIP call, their devices may make the connections automatically without extra action on their part, other than manipulating the application as necessary to place the VOIP call or to accept an offered call.

Thus, at time 250 the caller activates a control within the application that allows him to initiate a real-time digitized or digital audio call to the callee. Illustratively, the control may be provided within a list of contacts or a contact card corresponding to the callee, within or in association with a message sent to or received from the callee, or in some other context. The call offer identifies the caller and callee (or their devices), such as with identifiers known to the application host system (e.g., telephone numbers, electronic mail addresses), provides audio parameters that are supported by the caller device (e.g., codec(s), sampling rates), the local or internal address (and possibly port) of caller 210, and/or other information.

In response, communication server 220 acknowledges the call offer and identifies a set of relay servers (including relay server 230 of FIGS. 2A-B) that are available for use in a relay mode of operation of the requested call, if necessary. In some embodiments, all existing relay servers may be identified; in other embodiments, a subset of all servers may be identified, based on the location of caller 210 and/or callee 240, for example. The relay details illustratively include at least one address (e.g., and port), such as an IP (Internet Protocol) address and TCP (Transmission Control Protocol) or UDP (User Datagram Protocol) port, plus a relay token generated by the application host system and that verifies that caller 210 is authorized to use the relay server(s). Note that this token may be different from the device token (or device URI) mentioned above.

In addition to providing the relay details to caller 210, communication server 220 also forwards the call offer and the same or similar relay details to or toward callee 240. If the callee is currently connected to the application host system, the call offer is delivered and the callee device may ring (or buzz, vibrate, or present some other alert, depending on how it is configured) at time 252.

However, if callee 240 is not currently connected to the system, a push notification may be sent to the callee device to cause the application to start and to connect to the system so that the call offer can be delivered. The notification may be delivered or forwarded by the provider of the device's operating system, via Google Cloud Messaging (GCM) or Apple Push Notification Service (APNS), for example. The relay details provided to callee 240 may identify the same relay servers that were identified to caller 210, or may identify some other group of available relays. The callee device also receives a relay token to authorize it to use relay server 230.

The callee may reject or ignore the call offer, in which case the rejection is returned to the caller via communication server 220 (possibly with a reason for the rejection), but the method shown in FIGS. 2A-B assumes that she accepts or will accept the offered call.

Meanwhile, at or around time 252, the caller's and callee's devices bind with some or all of the relay servers identified to them, including relay server 230, which causes the relay server(s) to allocate endpoints for use in relaying digitized audio communications between the parties if and when they employ the relay mode of operation.

The relay servers acknowledge the binds (if they are able), and provide to each of the caller device and the callee device the device's external address, which may alternatively be known as its reflexive or public address. In these embodiments, the individual devices already know their own local or internal addresses (e.g., within their local networks), and can provide these to the application host system (e.g., communication server 220), but they may not know their external addresses.

In the illustrated method, the internal addresses are used within the devices' local networks (e.g., on one side of a network address translation or NAT entity), while they are known by their external addresses outside those networks (e.g., on the other/public side of the NAT entity). By communicating with the relay server(s) 230, the devices learn their external addresses.

Upon receipt of its external address, caller 210 reports that address to communication server 220, which forwards it to callee 240. Along with this external address, the caller sends (and the communication server forwards) latency information related to the relay server(s) 230 with which it has bound.

Specifically, in the illustrated embodiments, in order to select one of multiple relay servers for the parties to use during the relay mode of operation, they choose (or one of them chooses) a single relay server based on latencies involved in communications sent to the relays (e.g., the bind requests) and the relays' responses (e.g., their acknowledgements).

For example, the caller may calculate the latency involved in its request to each relay server and their response, and report to the callee the observed latencies for each server that responded (along with the caller's external address). The callee adds the latencies it observes to the values reported by the caller, to yield total latencies for each server, and then selects the relay server having the lowest total latency. As indicated in FIG. 2A, the callee may not send its bind requests and start measuring latencies until after it receives the call offer, while the caller can do so as soon as it knows the relay server details (e.g., their addresses).

Either or both parties may continue to send requests to a relay server that hasn't responded, for a limited period of time or throughout the call. Because a party may continue to obtain latency values even after the call is established, the selected relay server may change before the call is established and/or during the call.

Thus, the parties' devices select a relay server instead of having one selected for them by the application host system, and can do so very quickly. In other implementations, other methods may be applied to select one of the relay servers, and may or may not consider latency or timing information.

At time 256, the callee accepts the offered VOIP call and an accept message, the external address of the callee device, and an identifier (e.g., address) of the selected relay server are transmitted to communication server 220. As part of the accept message, the callee device sends its operating parameters that correspond to what the caller device already provided (e.g., codec(s), sampling rates, addresses/ports). If only one relay server was offered to the parties, the callee may omit identification of a selected relay server, or may simply acknowledge selection or acceptance of the one server. If multiple relay servers are available, and the callee has not yet selected one for the call by the time it accepts the call offer, the identifier of the selected relay server may be transmitted later.

In some embodiments, communications server 220 or some other system component may determine call parameters that can or will be used for a call, by one or both devices. Selection of parameters for a party's device may depend upon parameters previously (successfully) implemented by the device, by the device's current configuration, and/or other factors.

Shortly after accepting the call, callee 240 attempts to initiate either or both the peer-to-peer (P2P) and relay modes of operation.

In the illustrated method, both devices first turn to the relay mode of operation, partially because they have already opened connections with relay server 230 but have not yet been able to establish or verify P2P connectivity. In some other embodiments, however, the devices may first attempt to establish P2P connectivity and the P2P mode of operation.

Even while starting the relay mode of operation, however, callee 240 starts trying to verify connectivity with caller 210. Illustratively, a P2P connectivity check may involve one device attempting to contact the other device at any or all of the addresses it knows of (e.g., internal and/or external), in order to determine if a viable path exists. Lack of connectivity may be assumed (and the checks terminated at least for some period of time) if some number of connection requests (e.g., 10) fail.

If both devices are able to contact the other, they may begin negotiating a P2P connection. In the illustrated method, negotiation is performed incrementally (e.g., as each party's device becomes aware of the other device's pertinent address(es)) instead of being performed all at once.

Meanwhile, communication server 220 forwards the acceptance message, the callee's external address, and the identity (e.g., address) of the selected relay server to caller 210. Now the caller device can also start the digitized voice data communications with relay server 230 while negotiating (or attempting to negotiate) commencement of the P2P mode of operation with callee 240.

Therefore, at or about time 260, the caller and callee can begin their VOIP communications in the relay mode of operation, but may continue to attempt to establish the P2P mode, by attempting to contact each other and exchange any necessary communication parameters. If they are successful, they will automatically switch to that mode of operation as the favored mode. Also, however, a VOIP call may be asymmetric, meaning that one party may transmit data in one mode (e.g., P2P) while the other party transmits in another mode (e.g., relay). This may occur for only a transient period of time, for a significant period of time, or for the entire call.

In some embodiments, at a later time one or both of the parties' devices are moved, in which case they connect to different networks, which means their internal and external addresses will likely change.

As shown in FIG. 2B, for example, at time 270 the caller device moves (or is moved) and connects to a different Wi-Fi network, mobile carrier network, or other network. Therefore, the caller device sends a new bind request to relay server 230 (and/or other relay servers), which acknowledges the bind and identifies the device's new external address. The new bind request may include the same token that was previously provided to caller 210 by the system, or the caller device may obtain a new one prior to the new bind request.

Caller 210 then forwards its new external address to communication server 220 (and its internal address if not already known to the server), and the communication server forwards the new address(es) to callee 240. Caller 210 also initiates a new iteration of the relay mode of operation, using its new address(es).

Upon receipt of a new external address for the caller at time 272, the callee may fall back to a relay mode of operation. In particular, if the parties had been communicating P2P and the callee stops receiving packets via the P2P connection, it will immediately start the relay mode of operation for the VOIP call, via relay server 230, but will also attempt to renegotiate a P2P connection. If that fails, the parties may remain in the relay mode of operation.

Meanwhile, caller 210 starts trying to initiate the relay mode from its new address(es), using the known addresses of callee 240. If successful, they will negotiate operation of the P2P mode.

In some embodiments, addresses of caller 210 and/or callee 240 are prioritized, by the devices themselves or some other entity, to reflect the preference each should be given. For example, Wi-Fi addresses may normally be given higher priority than cellular addresses, and an internal address may be prioritized over an external address (if the parties' devices are on the same network).

However, when the call is disrupted, such as when one device changes networks, it may temporarily give highest priority to its new external address, regardless of whether that address is on a Wi-Fi network or a cellular network.

It should be understood that establishment and/or maintenance of a VOIP call may vary from one scenario or environment to another, and thus the content, format, and order of communications involved in such tasks may differ from one embodiment to another. In particular, any given entity may send or receive the various communications indicated in FIGS. 2A-B, or similar communications, with different timing, and some communications may intersect or cross paths with others.

For example, if a given device cannot perform background processing, some actions (such as those attributed to callee 240 before the call is accepted) may be performed later than indicated in FIGS. 2A-B.

In some implementations of the method of FIGS. 2A-B, each party's device maintains a persistent connection (e.g., a TCP connection) with communication server 220, but the digitized voice communications are conducted via a connectionless protocol (e.g., UDP) in either or both the relay and P2P modes. However, a device may employ TCP or some other suitable protocol for the digitized voice communications if UDP is not available, if attempts to establish a UDP connection fail, or for some other reason.

In some embodiments, call quality is monitored and, if the quality drops below a predetermined threshold, may trigger a switch from one mode of operation to the other.

Figure 3:
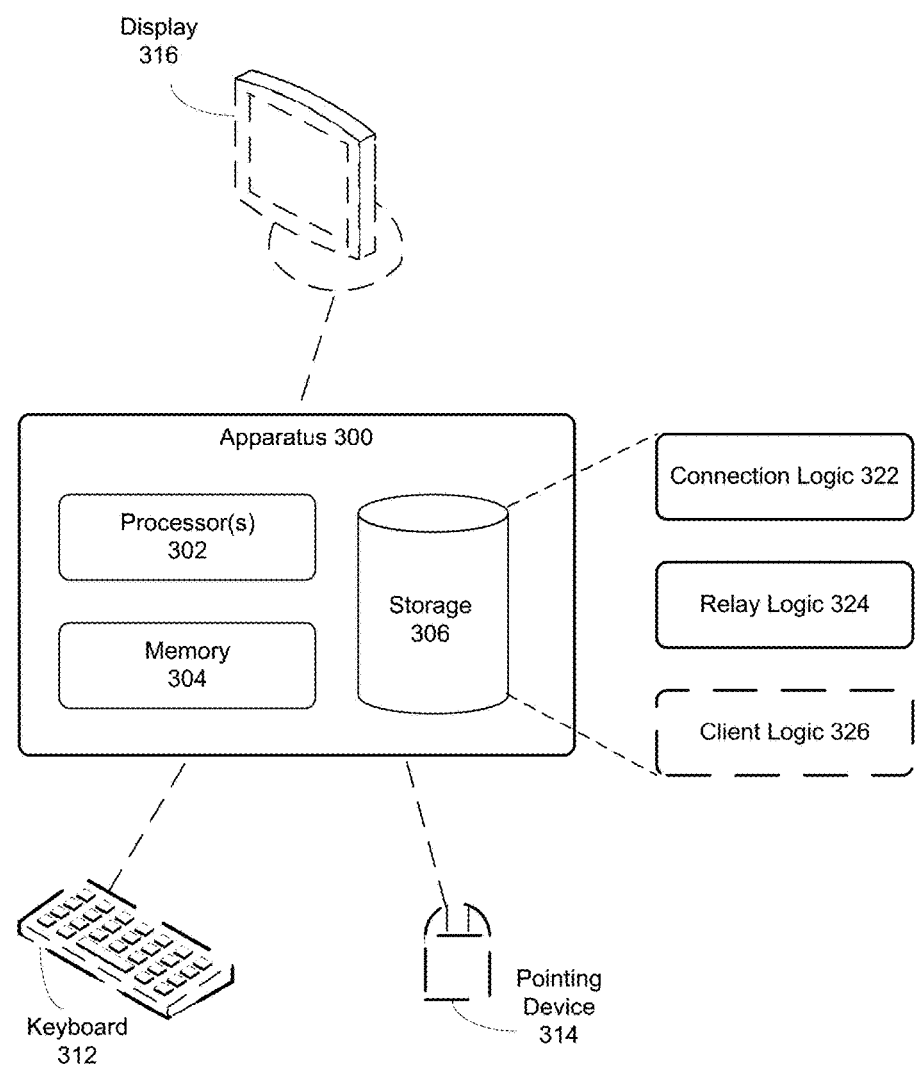
FIG. 3 is a block diagram of an apparatus for supporting establishment and maintenance of a VOIP call, in accordance with some embodiments.

FIG. 3 is a block diagram of an apparatus for supporting establishment and maintenance of a VOIP call, according to some embodiments. It will be understood that, in other embodiments, apparatus 300 may comprise multiple independent or semi-independent components for supporting such activity, such as communication servers, relay servers, state servers, and/or other components of an application host system.

Apparatus 300 of FIG. 3 comprises processor(s) 302, memory 304, and storage 306, which may comprise one or more electrical, optical, and/or magnetic storage components. Apparatus 300 may be coupled (permanently or temporarily) to keyboard 312, pointing device 314, and display 316. The apparatus may include other components omitted in the interest of clarity, such as communication modules for communicating via wired and/or wireless communication links, interface components for interfacing with other external devices such as other storage devices, a proxy server, a router, a load balancer, web servers, other apparatuses, etc.

Storage 306 of the apparatus stores logic that may be loaded into memory 304 for execution by processor(s) 302. Such logic includes connection logic 322 and relay logic 324, in addition to other logic necessary to operate and support an application hosted by the apparatus and used by multiple users. Storage 306 may also include optional client application logic 326 that is downloaded to and executed on client devices such as smart phones, tablet computers, and/or other devices. Memory 304 and/or storage 306 may also store various data generated or used by apparatus 300, such as user statuses, user account statuses, user contact lists, parameters for enabling communication with users' client devices, and so on.

Connection logic 322 comprises processor-executable instructions for receiving and managing connections with client devices operated by users of a communication application hosted by apparatus 300. These instructions allow the apparatus to receive connection requests, apply the correct protocol(s) to establish/maintain connections, terminate connections, exchange protocol messages that support the application, receive and deliver communications exchanged between users, exchange communication parameters and/or other information for conducting a VOIP call, etc.

Relay logic 324 comprises processor-executable instructions for supporting users' digitized voice communications by providing transport endpoints for relaying the communications, identifying network addresses of user devices, and/or taking other action.

Optional client logic 326 comprises processor-executable instructions for executing the application on a user's client device, including conducting VOIP calls. Thus, as described above, the client logic allows users to initiate and respond to call offers, bind with one or more relay modules or servers, measure latencies associated with the relay entities, select one relay for use during a relay mode of operation, send and receive digitized audio communications through the selected relay (when the relay mode of operation is active), establish a peer-to-peer communication connection with another user, send and receive digitized audio communications directly to and from the other user (when the peer-to-peer mode operation is active), re-establish a communication connection after changing networks, and so on.

In some embodiments, connection logic 322 and relay logic 324 are merged, further subdivided, or may be operated on different apparatuses.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A non-transitory computer-readable medium storing instructions that, when executed by a processor, cause a computer to:
   receive, at a first client device, a call offer from a caller at a second client device, the call offer including addresses of multiple candidate relay servers from a communication server;
   send a bind request from the first client device to the one or more of the multiple candidate relay servers;
   observe, at the first client device, latencies involved in the bind requests to the one or more multiple candidate relay servers;
   receive, from the second client device, a latency involved in binding the second client device to each of the one or more of the multiple candidate relay servers;
   calculate, a total individual latency for each candidate relay server by summing the observed latency for each candidate relay server with the latency received from the second client device for each candidate relay server;
   select by the first client device one of the multiple candidate relay servers according to the total individual latencies;
   transmit information regarding the selected relay server to the communication server from the first client device;
   participate in a communication session with the second client device in a relay mode of operation through the selected relay server; and
   iteratively cause the computer to:
      attempt to establish a peer-to-peer connection between the first client device and the second client device while communicating in the relay mode of operation;
      switch to the peer-to-peer mode of operation if a peer-to-peer connection has been established; and
      switch to the relay mode of operation if the peer-to-peer connection is lost.

2. The non-transitory computer-readable medium of claim 1, further comprising instructions that when executed cause the computer to:
   receive from the one or more of the multiple candidate relay servers an external address of the first client device in response to the bind request.

3. The non-transitory computer-readable medium of claim 2, further comprising instructions that when executed cause the computer to:
   send a new bind request to the selected relay server when the first client device roams from a first network to a second network;
   receive a new external address of the first client device from the selected relay server; and
   forward the new external address to the communication server from the first client device.

4. The non-transitory computer-readable medium of claim 1, further comprising instructions that when executed cause the computer to:
   select a different relay server; and
   send information regarding the selected different relay server to the communication server.

5. The non-transitory computer-readable medium of claim 1, further comprising instructions that when executed cause the computer to:
   receive an external address of the second client device from the communication server.

6. The non-transitory computer-readable medium of claim 1, further comprising instructions that when executed cause the computer to:
   receive a push notification regarding the call offer from a communication server when no communication connection exists between the first client device and a communication server.

7. The non-transitory computer-readable medium of claim 1, wherein participating in the communication session in the relay mode of operation is initiated only after the second client device and the first client device attempt to initiate the peer-to-peer mode of operation.

8. An apparatus comprising:
   a processor; and
   communication logic that, when executed by the processor, cause the processor to:
      receive, at a first client device, a call offer, from a caller at a second client device, the call offer including addresses of multiple candidate relay servers from a communication server;
      send a bind request from the first client device to the one or more of the multiple candidate relay servers;
      observe, at the first client device, latencies involved in the bind requests to the one or more multiple candidate relay servers;
      receive from the second client device a latency involved in binding the second client device to each of the one or more of the multiple candidate relay servers;
      calculate, a total individual latency for each candidate relay server by summing the observed latency for each candidate relay server with a latency received from the second client device for each candidate server;
      select by the first client device one of the multiple candidate relay servers according to the total individual latencies;
      transmit information regarding the selected relay server to the communication server from the first client device;
      participate in a communication session with the second client device in a relay mode of operation through the selected relay server; and
      iteratively cause the processor to:
         attempt to establish a peer-to-peer connection between the first client device and the second client device while communicating in the relay mode of operation;
         switch to a peer-to-peer mode of operation if a peer-to-peer connection has been established; and
         switch to the relay mode of operation if the peer-to-peer connection is lost.

9. The apparatus of claim 8, the communication logic further causing the processor to:
   receive from the one or more of the multiple candidate relay servers an external address of the first client device in response to the bind request.

10. The apparatus of claim 9, the client logic to:
    send a new bind request to the selected relay server when the first client device roams from a first network to a second network;
    receive a new external address of the first client device from the selected relay server; and
    forward the new external address to the communication server from the first client device.

11. The apparatus of claim 8, the communication logic further causing the processor to:

select a different relay server; and send the selected different relay server to the communication server.

12. The apparatus of claim 8, the communication logic further causing the processor to:

send a second call offer to the communication server, the call offer identifying a third client device;

receive addresses of multiple candidate relay servers from the communication server;

send a bind request to one or more of the multiple candidate relay servers;

determine a latency involved in the bind request to each of the one or more of the multiple candidate relay servers; and send the determined latencies to the communication server.

13. An apparatus comprising:

a processor; and communication logic executing on the processor to:

receive, from a calling device, an offer to establish a call between the calling device and a called device;

identify a set of relay servers that are available for use in a relay mode of operation for the offered call;

send, to the calling device, an acknowledgment of the offer, and a list of identified relay servers and forward, to the called device, the offer and the list of identified relay servers;

receive, from the calling device, an external address of the calling device, and observed latency information for one or more of the identified relay servers, and forward the external address of the calling device and the latency information to the called device;

receive, from the called device, an acceptance of the offer, the external address of the called device, and an address of a selected relay server and forward the acceptance, the external address of the called device, and the address of the selected relay server to the calling device.

14. The apparatus of claim 13 wherein the list of identified relay servers comprises a subset of all relay servers available for use.

15. The apparatus of claim 14 wherein the subset of all relay servers is identified based on the location of the calling device and the called device.

16. The apparatus of claim 13 wherein the list of identified relay servers includes, for each relay server, at least one address and port information.

17. The apparatus of claim 13 wherein a push notification is sent to the called device when it has been determined that the called device is not currently connected to the apparatus.

18. The apparatus of claim 17 wherein the offer is forwarded to the called device only after the called device connects to the apparatus.

19. The apparatus of claim 13 wherein a connection request is received from the calling device prior to receiving, from the calling device, the offer to establish the call.

20. The apparatus of claim 13 wherein the offer to establish a call includes at least an identification of the called device and audio parameters supported by the calling device.

* * * * *